United States Patent [19]

Miculici et al.

[11] Patent Number: 5,449,223
[45] Date of Patent: Sep. 12, 1995

[54] SHOULDER BELT HEIGHT ADJUSTMENT MECHANISM

[75] Inventors: Gabriela Miculici, Novi; Thomas Belanger, W. Bloomfield, both of Mich.

[73] Assignee: Hoover Universal, Inc., Plymouth, Mich.

[21] Appl. No.: 260,993

[22] Filed: Jun. 7, 1994

[51] Int. Cl.[6] .................. A62B 35/00; B60R 22/00; B60R 22/10
[52] U.S. Cl. .................. 297/484; 297/483; 297/238; 297/256.1; 297/219.12; 280/808; 280/801.2
[58] Field of Search .............. 297/484, 483, 219.2, 297/238, 256.1; 280/808, 801.2

[56] References Cited

U.S. PATENT DOCUMENTS

| | | | |
|---|---|---|---|
| 4,892,769 | 1/1990 | Perdelwitz et al. | 297/219.12 |
| 5,082,325 | 1/1992 | Sedlack | 297/483 |
| 5,135,285 | 8/1992 | DuKatz et al. | 297/484 |
| 5,332,284 | 7/1994 | Elton et al. | 297/484 |
| 5,340,198 | 8/1994 | Murphy et al. | 297/483 |

*Primary Examiner*—Peter R. Brown
*Assistant Examiner*—Anthony Barfield
*Attorney, Agent, or Firm*—Harness, Dickey & Pierce

[57] ABSTRACT

A shoulder belt height adjustment mechanism for a passenger restraint system, including a shoulder belt having upper and lower vertically spaced apart restraint slots in a back panel. The restraint slots are connected to one another by a transfer passage which couples an inboard end of one restraint slot with the outboard end of the other restraint slot so that the shoulder belt can be moved from on restraint slot to the other restraint slot without twisting of the shoulder belt in the process.

14 Claims, 3 Drawing Sheets

SHOULDER BELT HEIGHT ADJUSTMENT MECHANISM

BACKGROUND AND SUMMARY OF THE INVENTION

The present invention relates to a height adjustment mechanism for a vehicle seat shoulder belt and in particular to a height adjustment for a shoulder belt of a child's seat.

Special child seats that provide protection for infants and small children in motor vehicles are well known. Two different types of child seats have been developed. One type is a separate seat which is placed upon a vehicle seat and attached thereto by the seat belt provided as part of the vehicle seat. A second type of child seat is commonly referred to as an "integral child seat" in which the components of the child seat are built into the vehicle seat. Integral child seats typically include one or more moveable components which, in one position, enable use of the seat by an adult, and in a second position enable use of the seat by a small child. Common elements of both types of child seats are a generally horizontal seat support, a back panel and a restraint system for the seat occupant. Restraint systems generally include a shoulder belt which is operatively connected between the back panel and the seat support to restrain a passenger positioned on the seat support and against the back panel.

In order to accommodate children as they grow in size, adjustment of the shoulder belt height on the back panel is required. With the separate, add-on child seats, shoulder belt height adjustment is made simple by virtue of the fact that the seat is removable, providing easy access to the rear of the back panel. The back panel is made with two or more vertically spaced apart slots for each shoulder belt, and the belt system is constructed such that the belts can be removed from one slot and rethreaded through another slot to make the necessary height adjustment.

However, with the integral child seats, access is typically not available to the rear of the back panel, precluding disassembly of the restraint system for adjusting the shoulder belt height. A common approach to provide adjustment is to connect the spaced apart shoulder belt restraint slots with a connecting passage in the back panel. The connecting passage allows the shoulder belts to be moved from one slot, through the connecting passage, to another slot without withdrawing the shoulder belt from the back panel. An example of such an adjustment mechanism is shown in FIG. 1. A child seat back panel 100 is shown having left and right sets 102 of shoulder belt restraint slots 104, 106, 108. Shoulder belts 110 are shown passing through the back panel in lower restraint slots 108. The restraint slots are connected to one another at the outboard ends of the restraint slots by horizontal adjustment slits 112, 114, 116 which are coupled to vertical connector slits 118.

The vertical connector slits extend downward beyond the lowest restraint slot 108 of each set forming extensions 120. The extensions enable the shoulder belts to be moved from one restraint slot to another without twisting the shoulder belts. This is accomplished, for example, by moving a belt 110 from the lowest restraint slot 108, through its transfer slit 116 and moving the belt outboard edge 122 down into the extension 120. This is followed by moving the belt upward and into the intermediate restraint slot with the inboard edge 124 of the belt leading into the intermediate restraint slot 106. This avoids a twist in the shoulder belt which, if present, can interfere with the proper functioning of the child seat restraint system.

In the example shown in FIG. 1 with three restraint slots, it is possible to properly adjust the should belt height without twisting the shoulder belt and without the need for the downward extension 10 of the connector slit. However, in a system having only two restraint slots, a separate extension of the connector slit is required to make an adjustment without twisting the shoulder belt.

While the adjustment mechanism shown in FIG. 1 enables the shoulder belt height to be adjusted without twisting the shoulder belt, it does not preclude the possibility of an incorrect adjustment in which the extension 120 of the connector slit 118 is not used and the shoulder belt is adjusted by inserting the shoulder belt into a restraint slot with the belt's outboard edge leading, thereby placing a twist in the shoulder belt.

Accordingly, it is the object of the present invention to provide a shoulder belt height adjustment mechanism which precludes incorrect adjustment and in which the shoulder belt can only be adjusted in a manner that does not twist the shoulder belt.

The shoulder belt height adjustment mechanism of the present invention provides a transfer passage between the restraint slots which connects to opposite ends of the restraint slots. For example, the transfer passage will connect the inboard end of one restraint slot with the outboard end of the next vertically adjacent restraint slot. As a result, when the shoulder belt is adjusted, the edge of the shoulder belt, which leads as the belt leaves the first slot, also leads as the belt enters the next slot. However, since it is entering the second slot at the opposite end from which the belt exited the first slot, no twisting results in the shoulder belt. Furthermore, the transfer passage does not permit an incorrect adjustment to be made by twisting the belt. The concept of the invention can be utilized with any number of vertical spaced restraint slots.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
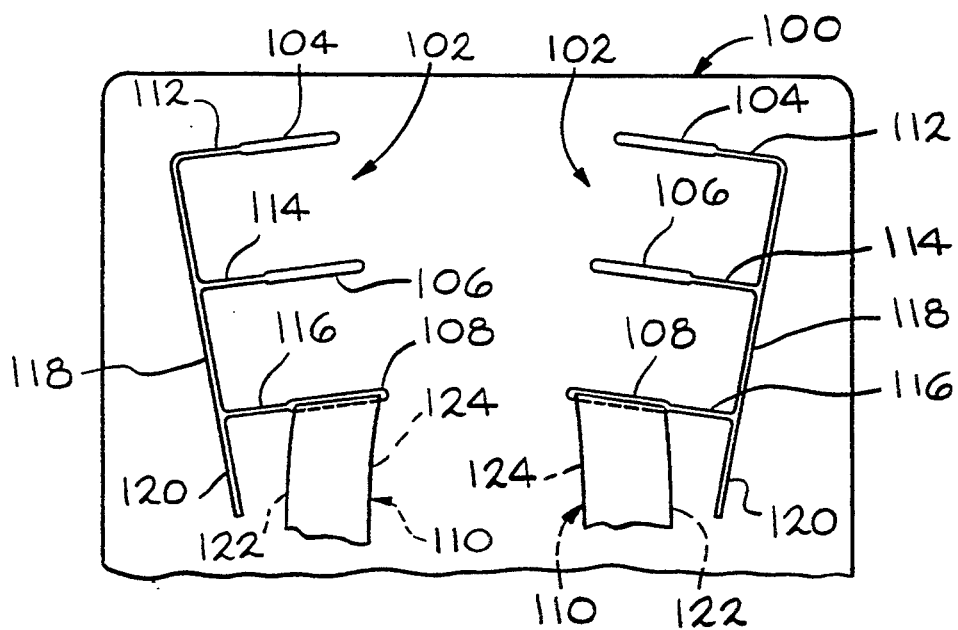
FIG. 1 is a fragmentary plan view of a seat back panel showing a prior art shoulder belt height adjustment mechanism.
Figure 4:
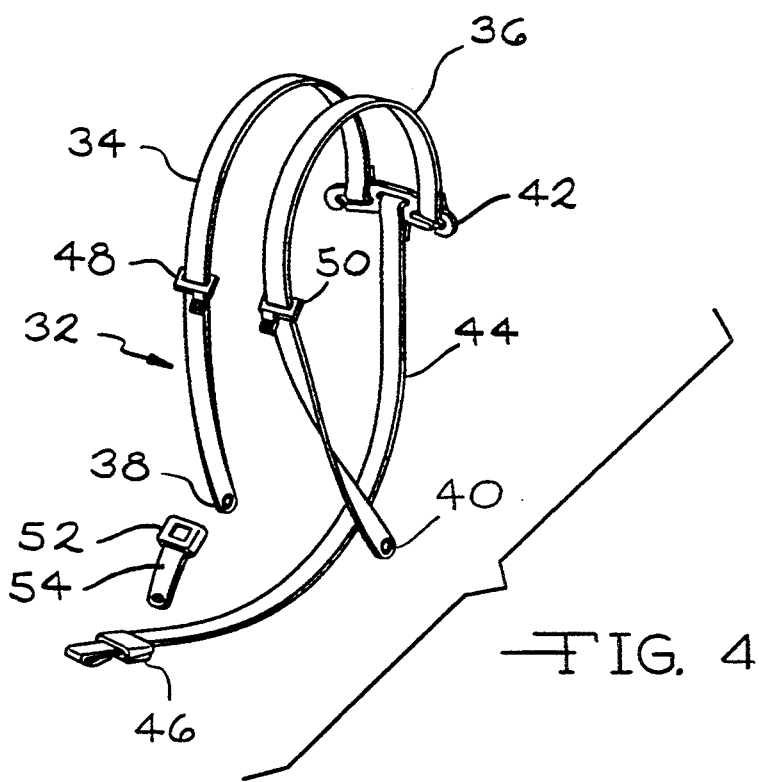
FIG. 4 is a fragmentary prospective view of the child seat restraint system.
Figure 2:
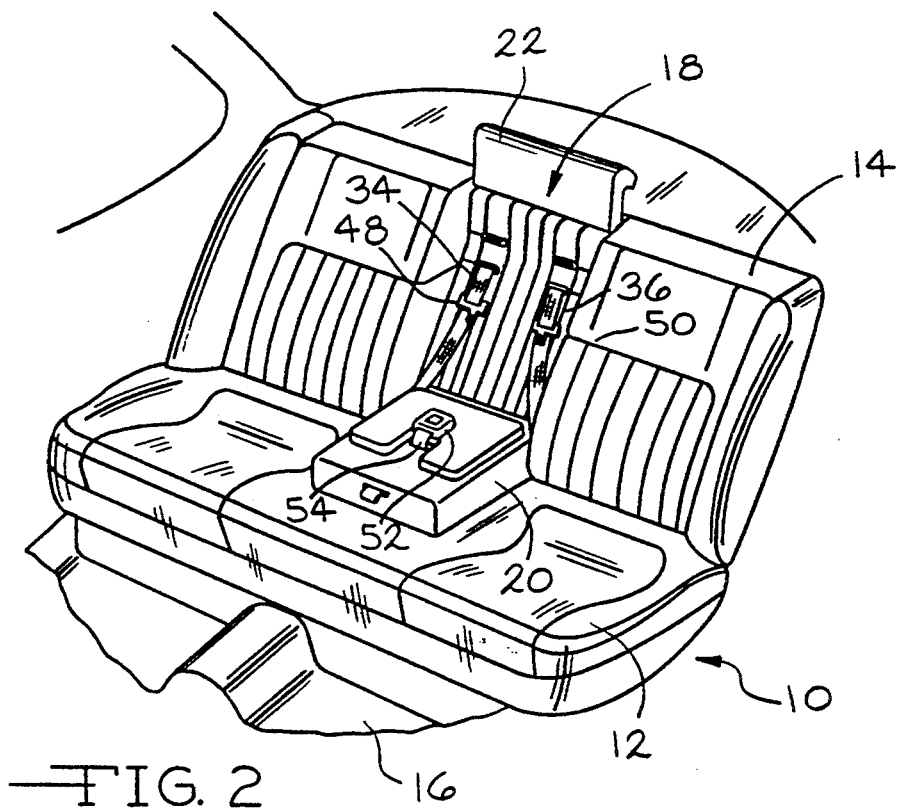
FIG. 2 is a perspective view of a vehicle seat with an integral child seat having the shoulder belt height adjustment mechanism of the present invention.

Vehicle seat 10 shown in FIG. 2 includes an integral child seat having the shoulder belt height adjustment mechanism of the present invention. Seat 10 is a conventional bench seat such as that found in the rear seat of a passenger car. The seat 10 includes a lower seat cushion 12 and a generally upright seat back 14. Seat 10 is attached to a vehicle body 16 by fasteners (not shown) in a well known manner. An integral child seat 18 is provided within the seat back 14 and includes a seat support 20 panel which is rotatably mounted to the seat back 14 and is shown in a forwardly rotated position for seating of a child thereupon. The child seat 18 further includes a head rest 22 which is movably mounted to the seat back and is shown in a raised position, forming a head rest for a child occupant. The child seat 18 includes a back panel 24 shown in FIG. 3 which is mounted to the frame 26 of seat back 14. The back panel 24 is covered with an upholstered pad 28 which is removably attached to the back panel 24. The pad 28 is shown extending across the top of the seat support 20 forming a seat cushion 30.

Child seat 18 has a restraint system 32 which includes a pair of shoulder belts 34, 36. The lower ends 38, 40 respectively, of the shoulder belts are attached to the seat support 20 at opposite sides thereof. From there, the belts 34 extend upwardly passing through the pad 28 and then overlying the pad 28 and back panel 24. Restraint slots in the back panel, described in detail below, enable the shoulder belts to pass therethrough and downwardly behind the back panel.

Behind the back panel 24, the two shoulder belts are attached to a divider plate 42 from which extends a single adjustment strap 44. Adjustment strap 44 passes through the seat support 20 and extends from the front end of the seat support (as considered in the open position of the child seat). The strap 44 extends through a latch 46 which includes a spring biased pawl that locks the adjustment strap 44 in place.

Figure 3:
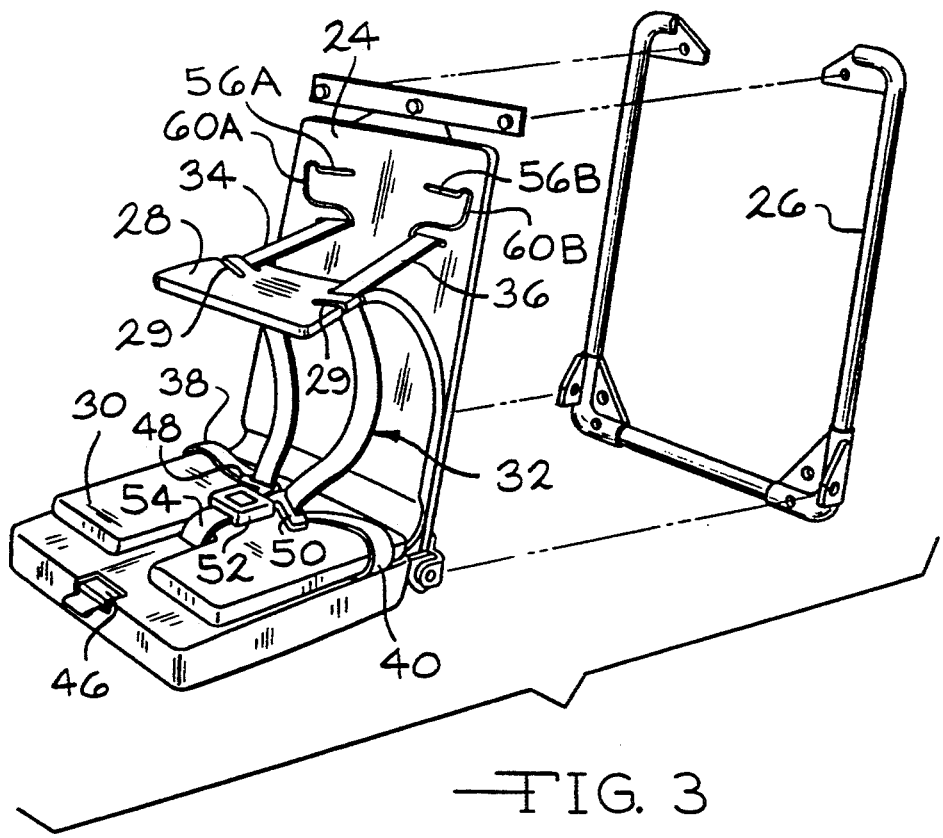
FIG. 3 is a fragmentary view of the integral child seat structure showing the shoulder belt height adjustment mechanism.

Clasps 48 and 50 are slideably mounted to the shoulder belts 34, 36 between the ends 38, 40 of the belts and the location where the belts pass through the back panel 24. A buckle 52 is mounted to the seat support 20 by a short strap 54 so as to be located between the legs of a passenger positioned on the seat support 20. The passenger is restrained in the seat by inserting the clasps 48, 50 into the buckle, as shown in FIG. 3, when fastened, the shoulder belts 34, 36 extend over the occupant's shoulders, down to the buckle 52 and from there, over the lap of the passenger to opposite sides of the seat support to form a lap belt. Once the clasps have been buckled, the length of the shoulder straps 34, 36 is shortened by pulling the adjustment strap 44 out of the front end of the seat support.

The passenger is removed by manually releasing the buckle 52 and, if necessary, lengthening the shoulder belts by releasing the latch 46 and pulling the shoulder belts 34, 36 forward from the back panel. While the present invention is shown in the context of a manually adjusted shoulder belt length, a belt retractor can be used for automatically retracting the shoulder belts 34, 36 to adjust their length. Other belt arrangements can be employed as well, such as a three point restraint instead of the five point restraint shown.

Figure 5:
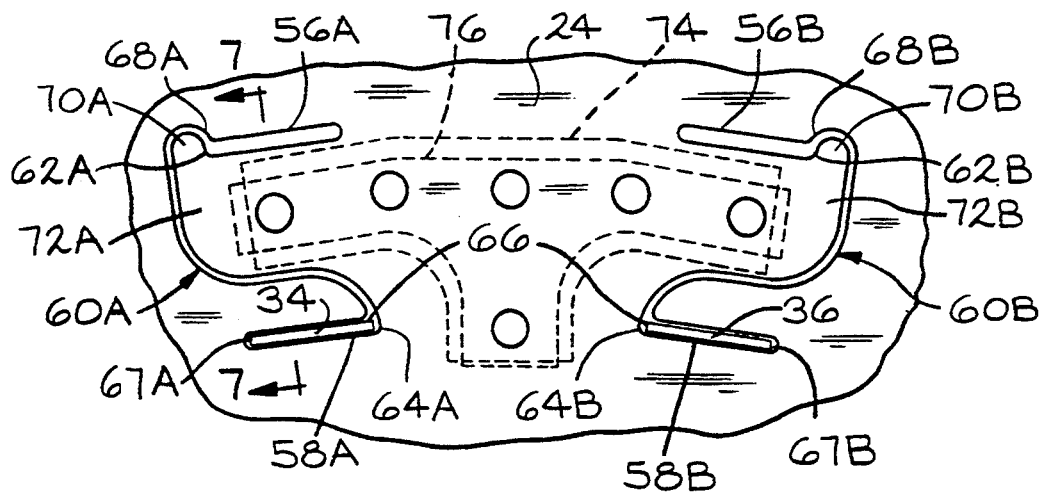
FIG. 5 is an enlarged fragmentary view of the child seat back panel illustrating the shoulder belt height adjustment mechanism.

The shoulder belt height adjustment mechanism is best illustrated with reference to FIG. 5. The adjustment mechanism includes a pair of restraint slots for each shoulder belt, upper restraint slot 56A and lower restraint slot 58A for shoulder belt 34, and upper restraint slot 56B and lower restraint slot 58B for shoulder belt 36. The upper and lower restraint slots are vertically spaced apart to provide the height adjustment for the shoulder belts.

Transfer passages 60A, 60B are provided to connect the upper and lower restraint slots on each side with one another. The transfer passages 60 connect the outboard ends 62 of the upper restraint slots 36 to the inboard ends 64 of the lower restraint slots 58. To raise the shoulder belts from the lower restraint slots to the upper restraint slots, the belts are moved through the transfer passages 60 with the inboard edges 66 of the belts leading through the transfer passages. The inboard edges are then fed first into the upper restraint slots 56. During adjustment to lower the shoulder belts, the belt outboard edge 67 exits the upper restraint slot first and is fed into the lower restraint slot first so as to be positioned at the outboard end of the lower restraint slot. The foam pad 28 has slots 29 for the shoulder belts which extend to the edges of the pad. This allows the pad to be placed on the back panel with the shoulder belts in place after height adjustment.

The transfer passages are formed with an initial portion 68 extending upwardly from the outboard ends 62 of the upper restraint slots. This upwardly extending portion produces tabs 70 which form the ends of the upper restraint slots to prevent inadvertent displacement of the shoulder belts from the restraint slots into the transfer passages.

Figure 7:
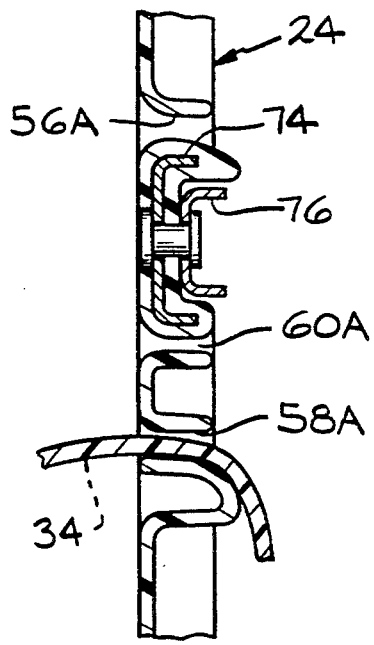
FIG. 7 is a sectional view of the child seat back panel as seen from substantially the line 7—7 of FIG. 5.

The transfer passages cross over between the upper and lower restraint slots, from the outboard ends of the upper restraint slots to the inboard ends of the lower restraint slots. This forms cantilevered portions 72 in the back panel which support the shoulder belts in the upper restraint slots. Depending upon the choice of materials used in back panel 24, the panel may need to be locally reinforced. With reference to FIG. 7, the back panel 24 is shown constructed of a molded thermal plastic resin with the reinforcement plate 74 molded into the resin and a second reinforcement plate 76 attached to the rear of the back panel.

By arranging the transfer passages such that they connect to the outboard ends of the upper restraint slots, the two cantilevered portions 72A, 72B extend outwardly from the center of the back panel. This enables single piece reinforcement plates 74, 76 to extend into and reinforce both of these portions. The transfer passages could be configured so as to connect the inboard ends of the upper restraint slots with the outboard ends of the lower restraint slots, if desired. However, separate reinforcement plates would be required for each of the resulting cantilevered portions, and the reinforcement plates would each individually reinforce smaller portions of the back panel. Depending on the material choice for the back panel, reinforcement may not be needed.

Figure 6:
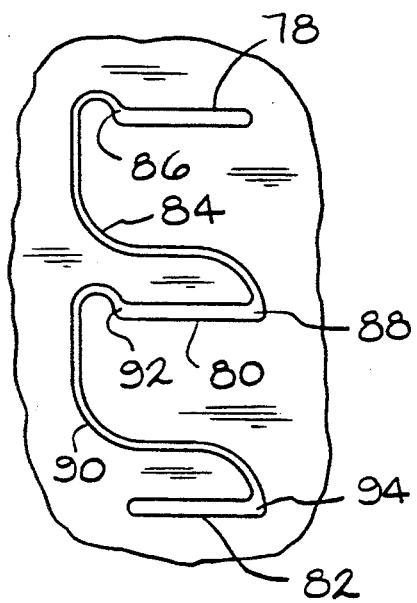
FIG. 6 is an alternative embodiment of the shoulder belt height adjustment mechanism showing three adjustment positions as opposed to two.

With reference to FIG. 6, an alternative embodiment of the height adjustment mechanism is shown. In this embodiment, three restraint slots 78, 80, 82 are provided. A transfer passage 84 connects the outboard end 86 of the upper restraint slot 78 to the inboard end 88 of the middle restraint slot. A second transfer passage 90 connects the outboard end 92 of the middle restraint slot 80 to the inboard end 94 of the lower restraint slot 82. Any number of restraint slots and transfer passages can be provided as needed, depending upon the performance requirements for the child seat.

The seat belt height adjustment mechanism has been shown and disclosed in the context of an integral child seat where it has its greatest application due to the inaccessibility to the rear of the child seat back panel. However, the height adjustment mechanism is not limited to an integral child seat application and can be used in separate add-on child seats, if desired, as well as in other seat applications where a height adjustment of a shoulder belt is desired.

It is to be understood that the invention is not limited to the exact construction illustrated and described above, but that various changes and modifications may be made without departing from the spirit and scope of the invention as defined in the following claims.

We claim:

1. A shoulder belt adjustment mechanism in a passenger restraint system including a back panel, a seat support and a shoulder belt operatively connected between said back panel and said seat support to restrain a passenger positioned on the seat support and against the back panel, said shoulder belt adjustment mechanism comprising:

upper and lower vertically spaced apart restraint slots in said back panel, each restraint slot having an inboard end and an outboard end wherein each of said inboards are directed towards an inner central portion of said back panel, and each of said outboard ends are directed towards an outer edge portion of said back panel; and a transfer passage in said back panel connecting said inboard end of one of said restraint slots with the outboard end of the other of said restraint slots;

said shoulder belt being operatively mounted through one of said restraint slots and being movable to the other of said restraint slots through said transfer passage.

2. The adjustment mechanism of claim 1 wherein said transfer passage connects to said upper restraint slot at the outboard end thereof and connects to said lower restraint slot at the inboard end thereof.

3. The adjustment mechanism of claim 1 wherein said transfer passage initially extends upward from restraint slots.

4. A child seat comprising:

a back panel;

a seat support;

twin shoulder belts operatively connected between said back panel and said seat support to restrain a passenger positioned on said seat support and against said back panel;

shoulder belt adjustment mechanism including two oppositely disposed, horizontally spaced apart sets of restraint slots in said back panel, each set of restraint slots including upper and lower vertically spaced apart restraint slots, and each restraint slot having an inboard end and an outboard end wherein each of said inboards are directed towards an inner central portion of said back panel, and each of said outboard ends are directed towards an outer edge portion of said back panel; and each set of restraining slots including a transfer passage communicating between each of said restraint slots and connecting said inboard end of one of said restraint slots with the outboard end of the other of said restraint slots;

said twin shoulder belts being operatively mounted through oppositely disposed restraint slots and being movable to a higher or lower pair of said oppositely disposed restraint slots through said transfer passages.

5. The child seat of claim 4 wherein said transfer passages connect to said upper restraint slots at the outboard ends thereof and connects to said lower restraint slots at the inboard ends thereof.

6. The child seat of claim 4 wherein said transfer passages initially extend upwardly from said upper restraint Slots.

7. The child seat of claim 4 wherein said transfer passages initially extend upwardly from the outboard ends of said upper restraint slots and then downwardly and inwardly to the inboard ends of said lower restraint slots, crossing from said outboard ends of said upper slots to said inboard ends of said lower slots between said upper and lower restraint slots.

8. The child seat of claim 4 wherein said transfer passages connect to said upper restraint slots at the outboard ends thereof and cross between-said upper and lower restraint slots to connect to said lower restraint slots at the inboard ends thereof.

9. The child seat of claim 4 further comprising means for reinforcing said back panel in the region of said back panel immediately below said upper restraint slots.

10. The child seat of claim 9 wherein said means for reinforcing includes a reinforcement plate within said back panel extending below each of said upper restraint slots.

11. A child seat comprising:

a molded plastic back panel;

a seat support;

twin shoulder belts operatively connected between said back panel and said seat support to restrain a passenger positioned on said seat support and against said back panel;

shoulder belt adjustment mechanism including two oppositely disposed, horizontally spaced apart sets of restraint slots in said back panel, each set of restraint slots including upper and lower vertically spaced apart restraint slots and each restraint slot having an inboard end and an outboard end wherein each of said inboards are directed towards an inner central portion of said back panel, and each of said outboard ends are directed towards an outer edge portion of said back panel; and each set of restraining slots including a transfer passage communicating between each of said restraint slots and connecting said inboard end of one of said restraint slots with the outboard end of the other of said restraint slots;

said twin shoulder belts being operatively mounted through oppositely disposed restraint slots and being movable to a higher or lower pair of said oppositely disposed restraint slots through said transfer passages.

12. The child seat of claim 11 further comprising a reinforcement plate within said back panel in the region of said back panel immediately below said upper restraint slots.

13. The child seat of claim 11 wherein said transfer passages connect to said upper restraint slots at the outboard ends thereof and cross between said upper and lower restraint slots to connect to said lower restraint slots at the inboard ends thereof.

14. The child seat of claim 13 further comprising a reinforcement plate in said back panel which reinforces said back panel in the region immediately below both of said upper restraint slots.

* * * * *